Patented Mar. 9, 1937

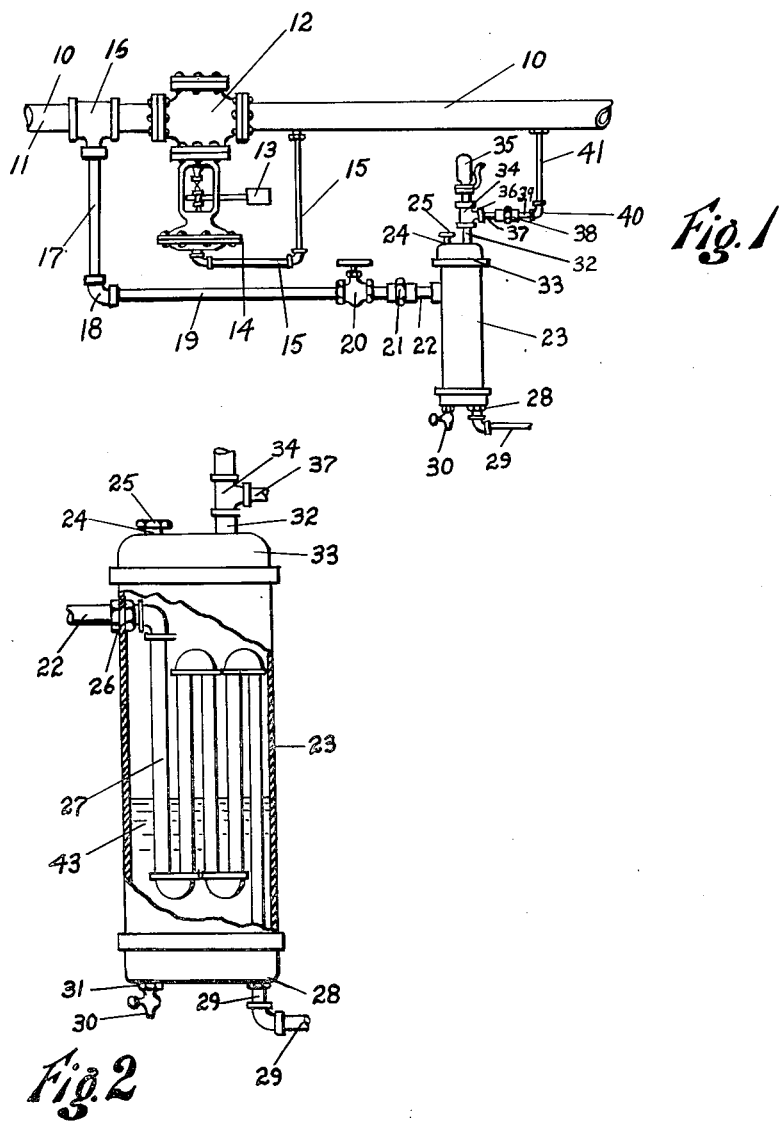

2,073,139

UNITED STATES PATENT OFFICE 2,073,139

APPARATUS FOR TREATING STEAM HEATING SYSTEMS

Otto J. Bublitz, Milwaukee, Wis.

Application May 2, 1935, Serial No. 19,390

3 Claims. (Cl. 237—1)

This invention relates to an improved process and apparatus for treating steam heating systems and more particularly to a process and device of the kind adapted for the treatment of a steam heating system in a building having no boiler.

An object of the invention is to utilize the steam passing through the lines of the system in carrying an agent adapted to eliminate scaling, incrustation and clogging of the tubes and associated parts of the apparatus.

Another object of the device is to provide an economical method requiring no additional upkeep expense and employing power already existing in the system for its operation.

Other and further objects of the device will appear as the description proceeds.

Reference being had to the accompanying drawing in which:

Fig. 1 is a view in elevation showing a portion of the main pipe line with the reducing valve and a compound feeder embodying my invention.

Fig. 2 is a view partly broken away to show the interior coil arrangement of the compound feeder.

Referring more particularly to the drawing, the numeral 10 designates the main pipe line of the device and the figure 11 represents the intake end thereof. A reducing valve 12 is interposed in said main line 10 and has the conventional weight 13, diaphragm 14 and pressure line 15. On the intake side of the reducing valve 12 is a T-connection 16 communicating with line 17, union 18 and line 19 through the globe valve 20, union 21, line 22, with the compound feeder container 23. An intake opening 24 in container 23 is normally closed by plug 25 and is provided for introduction of anti-incrustation compound. The line 22 communicates at 26 with heating coil 27. The coil 27 connects at 28 with return line 29 which has a trap (not shown) therein. A petcock 30 is provided in the bottom 31 of container 23 for draining thereof. A vertical line 32 is inserted in the top 33 of container 23 communicating with the T-connection 34 which has vertically inserted therein the blow-off device 35, and whose other socket 36 leads to the main line 10 by means of line 37, union 38, line 39, elbow 40 and line 41.

In use, a quantity of liquid incrustation preventing compound 43 is inserted into container 23. The said compound may consist of caustic soda; sodium hydroxid, NaOH; or a compound formed by mixing equal parts of sodium silicate and sodium sulfate. The use of these compounds is well known in the art, and the choice of a particular compound for use in the applicant's device in the manner specified would require only mechanical skill. The heat from main line 10, running through the coil 27 will raise the temperature of the liquid 43 until steam is generated. The steam thus generated will force its way into main line 10 by means of line 41 and related parts and will thus distribute the treating material through the steam heating system. Due to the fact that the steam, used to heat the contents 43 of the container 23, is drawn from the high side of reducing valve 12 and that the container 23 communicates with the low side of the main line from said reducing valve, the entry therein of the steam bearing treating material is facilitated.

The device is capable of various modifications in structure and design without departing from the spirit of the invention, all within the scope of the appended claims.

Having thus described my invention, what I claim as new and desire to secure by Letters Patent of the United States, is:—

1. An apparatus for treating a steam heating system having a reducing valve adjacent its inlet, comprising a steam line connecting the high pressure side of said reducing valve, with a coil within a casing containing a treating compound whereby said compound will be heated to generate steam in said casing and means between the latter and the low pressure side of said reducing valve, permitting entry of said compound into said system.

2. An apparatus of the class described for a steam heating system having a pressure reducing valve comprising a container for compound and water to be vaporized, a heating coil in said container communicating with the high pressure side of said reducing valve, and means connecting said container with the steam line on the low pressure side of said reducing valve.

3. In a device of the class described, a main line, a reduction valve therein, a line leading from the high pressure side of said main line, a coil on said leading line, a compound container surrounding said coil, a line leading from said container to said main line on the low pressure side of said reducing valve, and blow-off means disposed therein.

OTTO J. BUBLITZ.